(12) United States Patent
Maret et al.

(10) Patent No.: US 7,500,542 B2
(45) Date of Patent: *Mar. 10, 2009

(54) SYSTEM FOR LUBRICATING AND COOLING A MECHANICAL ASSEMBLY

(75) Inventors: Pierre Maret, Lambesc (FR); André Baixas, Vitrolles (FR)

(73) Assignee: Eurocopter, Marignane (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/915,475

(22) Filed: Aug. 11, 2004

(65) Prior Publication Data

US 2005/0056490 A1    Mar. 17, 2005

Related U.S. Application Data

(62) Division of application No. 10/170,405, filed on Jun. 14, 2002, now Pat. No. 6,817,448.

(30) Foreign Application Priority Data

Jun. 15, 2001  (FR) .................................. 01 07845

(51) Int. Cl.
*F01M 1/08* (2006.01)
(52) U.S. Cl. .................. 184/6.26; 74/606 A; 184/6.4
(58) Field of Classification Search .................. 184/6.4, 184/6.11, 6.12, 6.26, 50.2, 55.1, 57; 60/39.08, 60/39.091; 74/606 A
See application file for complete search history.

(56) References Cited

U.S. PATENT DOCUMENTS

| 3,618,709 | A | 11/1971 | Boelkins ..................... 184/6.4 |
| 4,284,174 | A | 8/1981 | Salvana et al. ............... 184/6.4 |
| 4,717,000 | A | 1/1988 | Waddington et al. ......... 184/6.1 |
| 4,888,947 | A | 12/1989 | Thompson ................. 60/39.08 |
| 4,976,335 | A | 12/1990 | Cappellato .................. 184/6.4 |
| 5,097,926 | A | 3/1992 | Duello ....................... 184/6.4 |
| 5,129,482 | A | 7/1992 | Warner et al. ............ 184/104.3 |
| 5,190,121 | A | 3/1993 | Muzyk ....................... 184/6.5 |
| 5,344,101 | A | 9/1994 | Francois .................. 244/17.11 |
| 6,008,724 | A | 12/1999 | Thompson .................. 340/438 |
| 6,446,755 | B1 | 9/2002 | Varailhon et al. ........... 184/6.82 |

FOREIGN PATENT DOCUMENTS

EP    0468549    1/1992
FR    2685758    7/1993

*Primary Examiner*—David M Fenstermacher
(74) *Attorney, Agent, or Firm*—Dickinson Wright, PLLC

(57) ABSTRACT

A lubricating and cooling system for a mechanical assembly includes a first path having a reservoir of lubricating and cooling liquid and a second path having a source of pressurized gas. A feed mechanism receives the lubricating and cooling liquid from the first path and the pressurized gas from the second path and outputs the pressurized gas and liquid. First and second spray nozzles spray the pressurized gas and liquid onto the mechanical assembly. The first path has a pressure and flow limiter arranged between the reservoir and the first and second spray nozzles so that the first and second spray nozzles are fed with the lubricating and cooling liquid at a pressure no greater than 2 bar (2×105 Pascal).

8 Claims, 3 Drawing Sheets

SYSTEM FOR LUBRICATING AND COOLING A MECHANICAL ASSEMBLY

This is a divisional of application Ser. No. 10/170,405 filed Jun. 14, 2002 now U.S. Pat. No. 6,817,448.

BACKGROUND OF THE INVENTION

The present invention relates to a system for lubricating and cooling a mechanical assembly. Although not exclusively, it is particularly well suited to lubricating and cooling a transmission gearbox, particularly a main transmission gearbox, usually used on board helicopters. Thus, the present invention will be described more particularly hereinafter in relation to this application.

It is known that, for correct operation, such a transmission gearbox is lubricated and cooled, generally by a device which circulates a lubricating and cooling liquid, such as oil. In addition, to prevent said transmission gearbox from being able to be damaged or even destroyed through lack of lubrication and cooling in the event of this device failing during flight, a backup device is provided whose purpose is to, at least partially, lubricate and cool said transmission gearbox to allow the helicopter to continue to fly for a predetermined survival time.

DESCRIPTION OF THE PRIOR ART

For example, American patent U.S. Pat. No. 4,717,000 has already disclosed a system for lubricating and cooling helicopter transmission gearboxes comprising a main device which circulates a stream of oil under pressure through said transmission gearboxes and a backup device which is set in operation automatically or manually when said main device becomes defective. This backup device comprises:
- a reservoir connected to said main device so as to fill with lubricating and cooling liquid from said main device;
- a source of pressurized air, consisting of a compressor stage of the engine of said helicopter; and
- spray nozzles fed, on the one hand, with pressurized lubricating and cooling liquid from said reservoir and, on the other hand, with pressurized gas from said compressor stage, said spray nozzles being able to spray a mist of lubricating and cooling liquid onto certain components of said transmission gearboxes so as temporarily to supplement the defective main device.

In that known system, the lubricating and cooling liquid is contained in said reservoir at the relatively high pressure (at least 10 bar=$10^6$ pascal) of the main device and, should the latter fail, is expelled therefrom by the action of the compressed air produced by said compressor stage, the pressure of which has to overcome that of the liquid in the reservoir. The result of this is that the lubricating and cooling liquid sent to said nozzles is at a high pressure, itself equal to at least 10 bar ($10^6$ pascal). In consequence, the backup device consumes a significant amount of lubricating and cooling liquid and the reservoir of the backup device needs to be of large capacity, thus causing its mass and bulk to be high.

The object of the present invention is to overcome these disadvantages and to make it possible to produce a lubricating and cooling system which, for a backup device with the same predetermined survival time, requires only a reservoir with a capacity much lower than that of the known system described hereinabove.

SUMMARY OF THE INVENTION

To this end, according to the invention, the system for lubricating and cooling a mechanical assembly such as a helicopter transmission gearbox, said system comprising:
- a main lubricating and cooling device circulating a stream of lubricating and cooling liquid through said mechanical assembly at a relatively high pressure; and
- an auxiliary backup device set in operation automatically or manually when said main device becomes defective, said backup device comprising:
  - at least one reservoir of lubricating and cooling liquid;
  - at least one source of pressurized gas;
  - at least one spray nozzle which is fed, on the one hand, with pressurized lubricating and cooling liquid from said reservoir and, on the other hand, with pressurized gas from said source, which is able to spray onto a mist of lubricating and cooling liquid said mechanical assembly so as temporarily to supplement the defective main device, is notable in that:
- said reservoir of the auxiliary backup device is independent of said main device; and
- said spray nozzle is fed with lubricating and cooling liquid from said reservoir at a pressure at most equal to 2 bar ($2.10^5$ pascal).

What happens, according to the invention, because the reservoir of the auxiliary backup device is independent of the main device, that is to say because it has no hydraulic communication therewith, is that the lubricating and cooling liquid sent to the spray nozzles can be at a pressure far lower than that of the liquid of the main device, at most equal to 2 bar ($2.10^5$ pascal) and, preferably, roughly equal to 1 bar ($10^5$ pascal). The result of this is that, for the same predetermined survival time, the consumption of the backup device according to the present invention is far lower than that of the known system, which means that the amount of lubricating and cooling liquid needed for backup purposes is also far lower. As a result, the capacity, the mass and the bulk of the reservoir are considerably reduced.

Such a low pressure of the lubricating and cooling liquid used for backup purposes may be obtained in various ways. For example:
- the lubricating and cooling liquid contained in said reservoir is pressurized by said source of pressurized gas feeding said spray nozzle, for example a compressor stage of the helicopter engine, and a pressure and flow limiter is arranged between said reservoir and said spray nozzle; or alternatively
- the lubricating and cooling liquid contained in said reservoir is pressurized by an auxiliary gas source, for example a pressurized gas cylinder, independent of said pressurized gas source feeding said spray nozzle, and a pressure and flow limiter is arranged between said reservoir and said spray nozzle; or alternatively still
- the lubricating and cooling liquid contained in said reservoir is pressurized by a pump the outlet of which is connected to said reservoir by a bypass comprising a calibrated valve that opens as soon as the outlet pressure of said pump becomes higher than said feed pressure of the spray nozzle.

It is also noted that, because the reservoir of the auxiliary backup device is independent of the main device, it is easy and advantageous for said reservoir to be arranged some distance away from said mechanical assembly so that said lubricating and cooling liquid it contains does not experience the effect of the heat given off by said mechanical assembly.

Thermal degradation of the liquid contained in said reservoir is thus avoided.

When the system according to the present invention comprises a number of spray nozzles, these may be fed with pressurized gas and with lubricating and cooling liquid through a splitter.

In addition, these nozzles may be split into groups and all the nozzles in one group may be fed with pressurized gas and with lubricating and cooling liquid by a common feed device, all said common feed devices themselves being fed with pressurized gas and with lubricating and cooling liquid by said splitter.

BRIEF DESCRIPTION OF THE DRAWINGS

The figures of the appended drawing will make it easy to understand how the invention may be achieved. In these figures, identical references denote similar elements.

DESCRIPTION OF THE PREFERRED EMBODIMENTS

Figure 1:
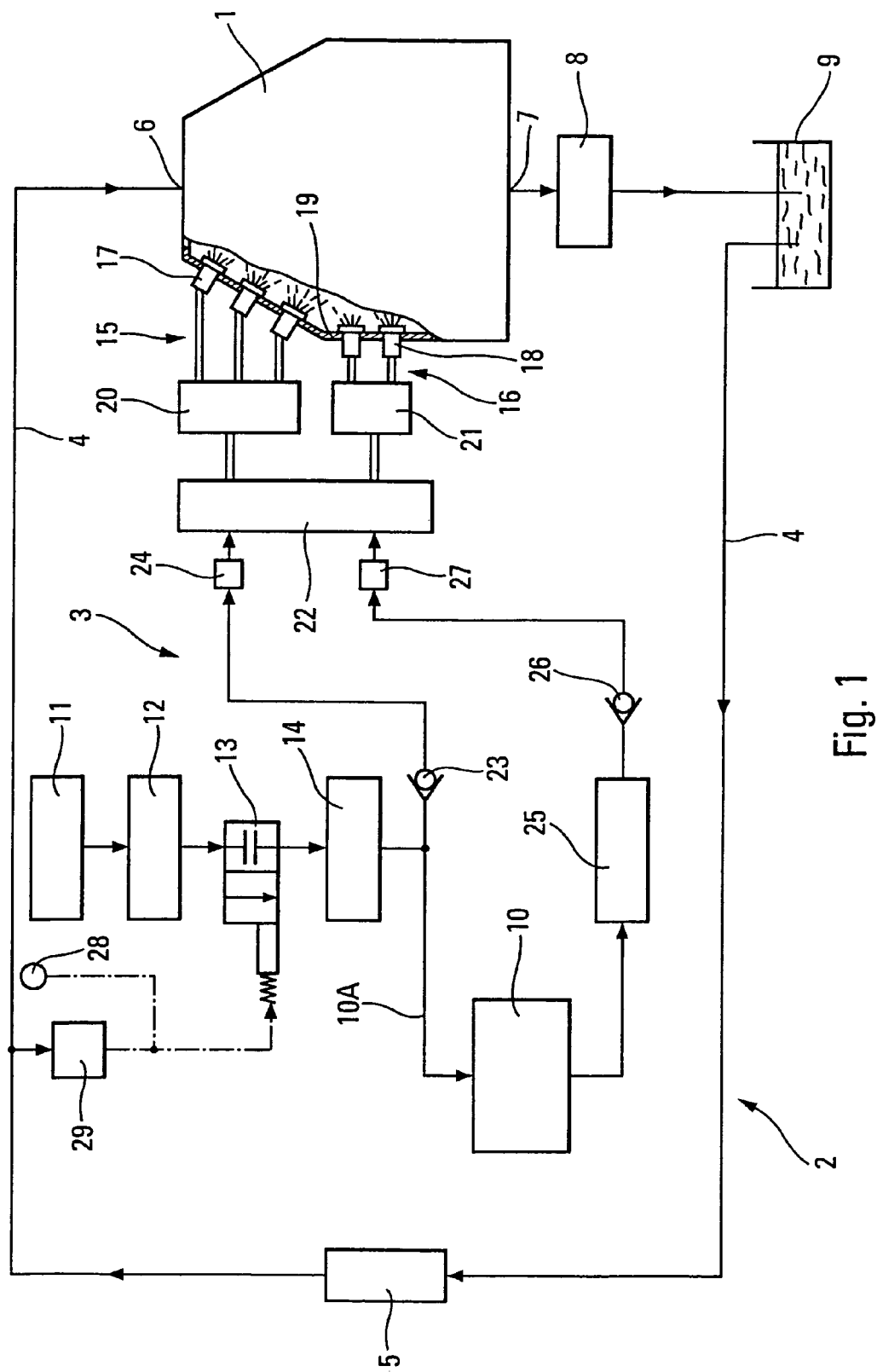
FIG. 1 schematically illustrates a lubricating and cooling system according to the present invention.

FIG. 1 schematically depicts the main transmission gearbox 1 of a helicopter (not depicted) and its lubricating and cooling system 2, 3.

This lubricating and cooling system comprises a main device 2 circulating through said main transmission gearbox 1 a stream of main lubricating and cooling liquid, essentially oil or some similar liquid. This main device comprises a closed-loop circuit 4 through which said main liquid circulates under the action of a pump 5. The circuit 4 introduces said main liquid at 6 into the main transmission gearbox 1 and, having lubricated and cooled the internal components of said main transmission gearbox (these components are not depicted), this main liquid is collected at 7 by said circuit 4. After filtering at 8, the main liquid thus collected is returned to a tank 9, from which it is once again circulated through the circuit 4 by the pump 5. The latter imparts to said main liquid a pressure generally of the order of around 10 bar.

The lubricating and cooling system additionally comprises an auxiliary backup device 3 set in operation when said main device 2 becomes defective, so as temporarily to maintain lubrication and cooling of the internal components of the main transmission gearbox 1 and thus prevent the latter from becoming damaged or even destroyed.

The auxiliary backup device 3 comprises a reservoir 10 of backup lubricating and cooling liquid, completely independent of the main device 2, that is to say that the reservoir 10 has no hydraulic connection with the circuit 4. The backup liquid (oil or similar product) contained in the reservoir 10 is pressurized by compressed air from a compressor stage 11 of the engine (not depicted) of the helicopter. This compressed air is sent to the reservoir 10 through a filter 12, a control valve 13 which is normally closed, for example of the electrically operated valve type, a cooler 14 and a connection 10A between the outlet of the latter and said reservoir 10. The cooler 14 may be of the heat exchanger type.

In addition, the reservoir 10 is preferably arranged some distance away from the main transmission gearbox 1 so that the backup lubricating and cooling liquid it contains does not experience the effect of the heat given off by said main transmission gearbox.

Furthermore, the auxiliary backup device 3 comprises groups 15, 16 of spray nozzles 17, 18, for example mounted on the housing 19 of the main transmission gearbox 1. The spray nozzles 17, 18 of the groups 15, 16 are of a known type which, fed with pressurized gas and with liquid that is to be sprayed, are able to spray said liquid in the form of a mist. In consequence, each spray nozzle 17 of the group 15 is connected, by a double connection (pressurized gas/liquid for spraying), to a feed device 20 able to deliver pressurized gas and liquid for spraying. Likewise, each spray nozzle 18 of the group 16 is connected, by a double connection (pressurized gas/liquid for spraying), to a feed device 21 able to deliver pressurized gas and liquid for spraying. In addition, the feed devices 20, 21 may themselves be fed with pressurized gas and with liquid for spraying from a splitter 22.

This splitter 22 may receive compressed air from the compressor stage 11, by virtue of a connection with the outlet of the cooler 14, via a nonreturn valve 23 and a filter 24. Likewise, the splitter 22 may receive backup lubricating and cooling liquid by virtue of a connection with the reservoir 10, via a pressure and flow limiter 25, a nonreturn valve 26 and a filter 27. Such a pressure and flow limiter 25 may consist of a calibrated pressure relief valve.

The control valve 13 may be opened manually using a member 28, for example available to the helicopter pilot, or via a pressure sensor 29 arranged in the circuit 4.

Thus, when the main circuit 2 becomes defective, for example following a breakdown of the pump 5 or a leak from the circuit 4, the pressure of the main lubricating and cooling liquid in said circuit 4 decreases very rapidly. The drop in pressure is detected by the sensor 29, which either is connected to an alarm (not depicted) alerting the pilot who can then act on the member 28, or directly opens the valve 13. Whatever the mode of operation (manual using the member 28 or automatic via the sensor 29), the valve 13 allows fluid through, which means that the compressed air from the compressor stage 11 is sent to the cooler 14, possibly after filtering at 12. The cooler 14 therefore feeds compressed air to both the splitter 22 (through the nonreturn valve 23 and the filter 24) and the reservoir 10 containing the backup lubricating and cooling liquid (via the connection 10A). The latter liquid is therefore also sent under pressure to the splitter 22, through the pressure and flow limiter 25, the nonreturn valve 26 and the filter 27. By virtue of the limiter 25, which may be of any known type, the pressure of the backup lubricating and cooling liquid at the splitter 22 is at most equal to 2 bar ($2.10^5$ pascal) and preferably equal to 1 bar ($10^5$ pascal).

The splitter 22 therefore feeds the feed devices 20 and 21 and the nozzles 17 and 18 with backup liquid (at this low pressure) and with compressed gas. These nozzles 17 and 18 are therefore able to spray a mist of said backup liquid onto the internal components (or some of them) of the gearbox 1, to lubricate and cool them so as to allow the gearbox (and therefore the helicopter) to survive in spite of the failure of the main device 2.

It will be noted that, because the pressure with which the backup lubricating and cooling liquid is sent to the nozzles 17 and 18 is low, the consumption of these nozzles is also low, which means that, for a predetermined survival time, the amount of backup liquid needed, and therefore also the volume of the reservoir 10, can be small. Thus the applicant company has been able to discover that, on one of its helicopters, the amount of backup lubricating and cooling liquid could, for the same survival time, be reduced from 35 liters to 10 liters by implementing the present invention.

In the alternative form of embodiment depicted in FIG. 2, there can be found all the elements 1 to 29 described hereinabove, arranged in the same way except as regards the connection 10A between the cooler 14 and the reservoir 10, which connection has been omitted.

Figure 2:
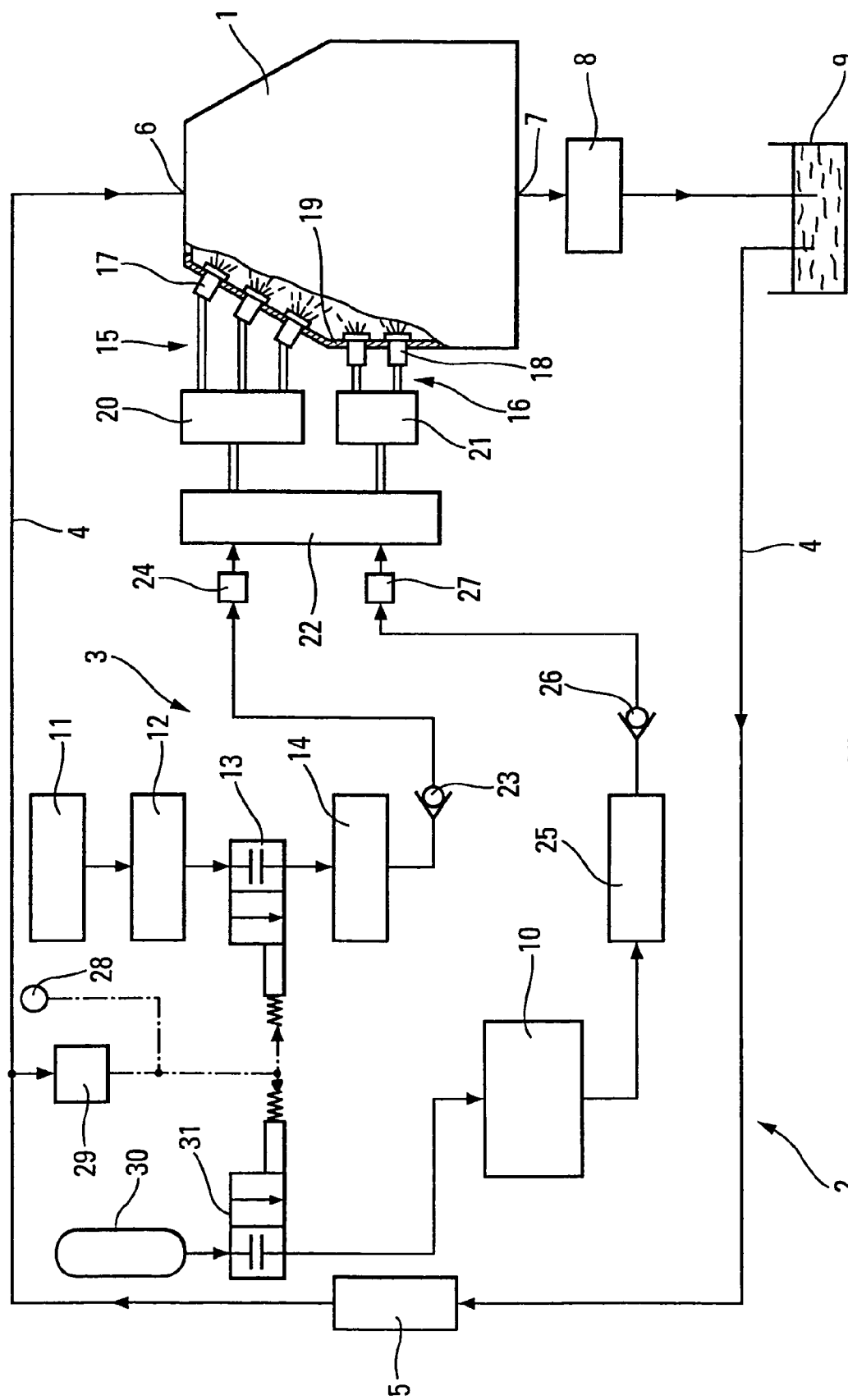
FIGS. 2 and 3 depict, in views similar to FIG. 1, alternative forms of embodiment of the lubricating and cooling system according to the invention.

By contrast, the system of FIG. 2 has, in addition by comparison with that of FIG. 1, a capsule 13 of pressurized gas and another valve 31, normally closed and in parallel with the valve 13. This valve 31 may also be of the electrically operated valve type. It can be opened by the member 28 and/or the pressure sensor 29, in the same way as was described hereinabove in respect of the valve 13, the valves 13 and 31 being operated jointly and simultaneously.

In the light of the foregoing explanations, it will therefore be readily understood that, in the event of the main device 2 becoming defective, the valves 13 and 31 are opened together so that the splitter 22, and therefore the spray nozzles 17 and 18, are fed with compressed air, as above, through the valve 13, the cooler 14, the nonreturn valve 23 and the filter 24, and with backup lubricating and cooling liquid by the action of the compressed gas capsule 30, through the pressure and flow limiter 25, the nonreturn valve 26 and the filter 27. As before, the pressure of the backup liquid at the nozzles 17 and 18 is at most equal to 2 bar ($2 \cdot 10^5$ pascal) and preferably equal to 1 bar ($10^5$ pascal).

Figure 3:
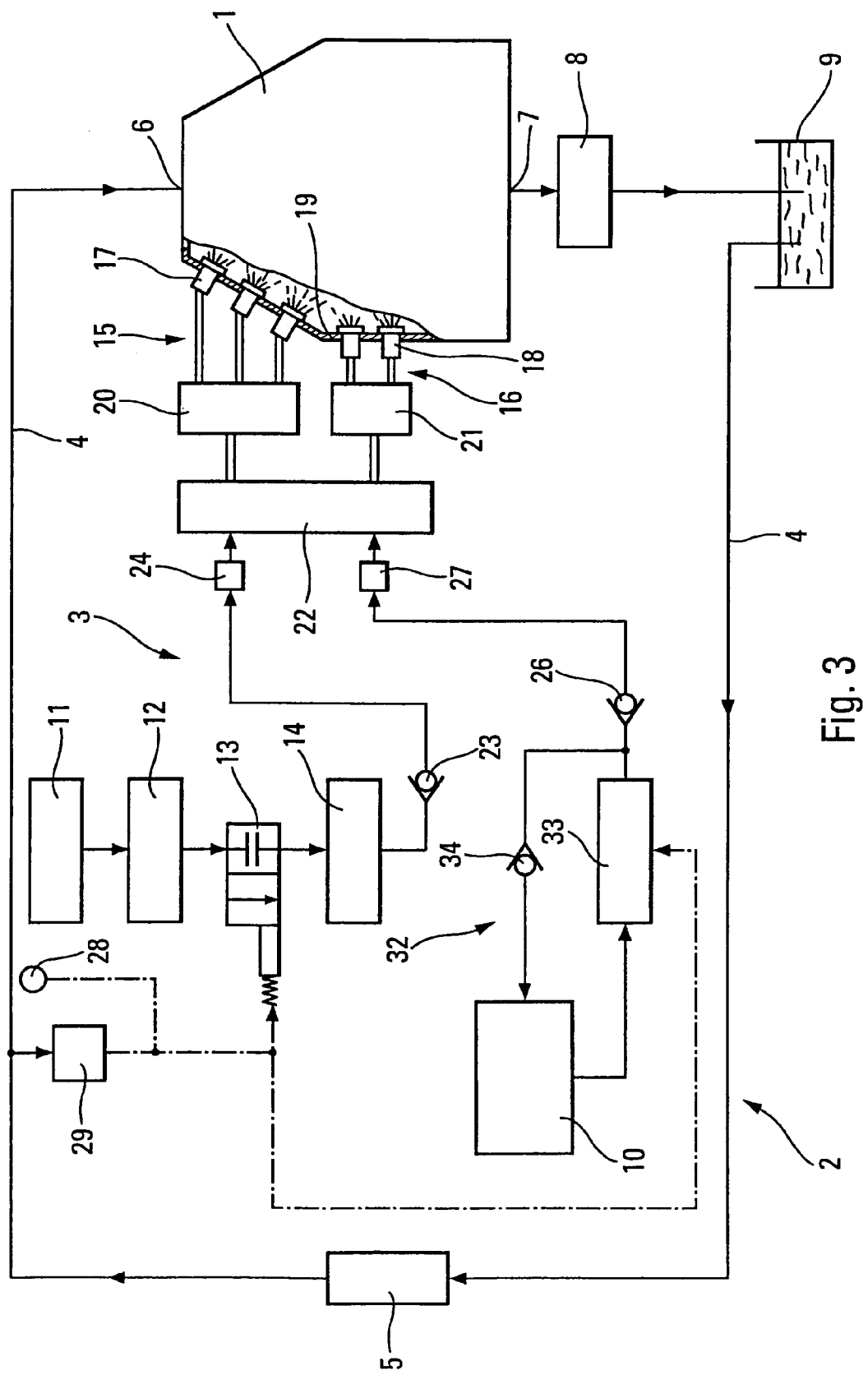

In the other alternative form of embodiment depicted in FIG. 3, there can again be found all the elements 1 to 24 and 26 to 29 described hereinabove with reference to FIG. 1 and arranged in the same way, the connection 10A between the cooler 14 and the reservoir 10 however being omitted. In addition, the pressure and flow limiter 25 is also omitted. The connection 10A and the limiter 25 are replaced by a device 32 comprising, on the one hand, a pump 33 which can be operated in parallel with the valve 13 by the member 28 and/or the sensor 29 and, on the other hand, a bypass comprising a nonreturn valve 34, which is mounted in parallel with the pump 33, between the outlet thereof and the reservoir 10. The opening of the nonreturn valve 34 is set to be just higher than the pressure desired for the nozzles 17 and 18. The pump 33 is, for example, of the positive-displacement type and performs regulation. It may be of variable output and adjustable pressure type.

Thus, when the main device 2 becomes defective, the member 28 and/or the pressure sensor 29 simultaneously open the valve 13 (as was the case for the systems in FIGS. 1 and 2) and actuate the pump 33 which sends the backup liquid contained in the reservoir 10 to the splitter 20 and to the nozzles 17 and 18. If the pressure of this backup liquid exceeds the desired low value (at most equal to 2 bar), then the nonreturn valve 34 opens and the liquid is returned to the reservoir 10. The nonreturn valve 34 therefore acts as a pressure limiter.

What is claimed is:

1. A system for lubricating and cooling a mechanical assembly, said system comprising:
   a main lubricating and cooling device circulating a stream of lubricating and cooling liquid through said mechanical assembly at a relatively high pressure; and
   an auxiliary backup lubricating and cooling device set in operation automatically or manually in response to a condition that said main device becomes defective, said backup device comprising:
   a first path comprising at least one reservoir of lubricating and cooling liquid that operates to feed said lubricating and cooling liquid provided under pressure;
   a second path comprising at least one source of pressurized gas that operates to output pressurized gas from said source;
   a feed mechanism that receives said lubricating and cooling liquid provided by said first path and said pressurized gas provided by said second path and outputs said pressurized gas and liquid;
   at least a first spray nozzle and a second spray nozzle that each receive said pressurized gas and liquid output from said feed mechanism, for spraying said pressurized gas and liquid onto said mechanical assembly; and
   said first path further comprising a pressure and flow limiter arranged between said reservoir and said first and second spray nozzles, and wherein:
   said first and second spray nozzles are fed with the lubricating and cooling liquid from said reservoir at a pressure at most equal to 2 bar ($2 \cdot 10^5$ pascal).

2. The system as claimed in claim 1, wherein said first and second spray nozzles are fed with the lubricating and cooling liquid at a pressure roughly equal to 1 bar ($10^5$ pascal).

3. The system as claimed in claim 1, wherein said reservoir of the lubricating and cooling liquid is arranged some distance away from said mechanical assembly so that said lubricating and cooling liquid contained in said reservoir does not experience the effect of the heat given off by said mechanical assembly.

4. The system as claimed in claim 1, wherein the lubricating and cooling liquid contained in said reservoir is pressured by said source of pressurized gas.

5. The system as claimed in claim 1, wherein said source of pressurized gas feeding said spray nozzle is formed by a compressor stage of said mechanical assembly.

6. The system as claimed in claim 1, further comprising a splitter that receives said lubricating and cooling liquid from said first path and said pressurized gas from said second circuit path and that outputs said pressurized gas and liquid to said feed mechanism, wherein said at least one first spray nozzle comprises a plurality of first spray nozzles and said at least one second spray nozzle comprises a plurality of second spray nozzles, said first spray nozzles and said second spray nozzles being fed with the pressurized gas and with the lubricating and cooling liquid through said splitter and said feed mechanism.

7. The system as claimed in claim 6, wherein said feed mechanism comprises first and second feed devices that receive said pressurized gas and liquid from said splitter and wherein all the nozzles in said plurality of first spray nozzles are fed with the pressurized gas and with the lubricating and cooling liquid by said first feed device and all the nozzles in said plurality of second spray nozzles are fed with the pressurized gas and with the lubricating and cooling liquid by said second feed device.

8. The system as claimed in claim 1, wherein the source of pressurized gas is not integral with the reservoir.

* * * * *